US006311142B1

(12) United States Patent
Glassner

(10) Patent No.: US 6,311,142 B1
(45) Date of Patent: Oct. 30, 2001

(54) METHODS FOR DESIGNING POP-UP CARDS, AND CARDS PRODUCED THEREBY

(75) Inventor: Andrew S. Glassner, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/231,288

(22) Filed: Jan. 15, 1999

(51) Int. Cl.$^7$ .................................................... G06F 17/50

(52) U.S. Cl. .................................... 703/1; 703/2; 700/98; 446/388; 446/488

(58) Field of Search ............................... 703/1, 2; 700/95, 700/97, 98; 345/433, 419; 446/80, 388, 488; 434/79; 40/124.08

(56) References Cited

U.S. PATENT DOCUMENTS

| | | | |
|---|---|---|---|
| 4,592,573 | * | 6/1986 | Crowell .............................. 40/124.08 |
| 5,799,424 | * | 9/1998 | Volkert et al. ..................... 40/124.08 |
| 5,861,889 | * | 1/1999 | Wallace et al. ...................... 345/433 |
| 5,983,538 | * | 11/1999 | Crowell .............................. 40/124.14 |
| 6,185,476 | * | 2/2001 | Sakai ..................................... 700/182 |

OTHER PUBLICATIONS

Brewer et al., "Customized Holiday Gifts—Use Your Family PC to Make Unique Gifts for Family and Friends", FamilyPC, Dec. 1, 1996, vol. 3, n 12, pp. 218–230.*

Hui et al "Single–Step Assembly of Complex 3–D Microstructures", Proc. Thirteenth Annual International Conf. on Micro Elector Mechanical Systems, pp. 602–607, Jan. 2000.*

Lafon, J. C., "Solid Modeling with Constraints and Parameterised Features"., IEEE Conference on Information Visualization, pp. 102–107, Jul. 1998.*

Glassner et al., "Know When to Fold", IEEE Computer Graphics and Applications, vol. 18, Issue 5, pp. 79–85, Oct. 1998.*

Mark Hiner, *Paper Engineering for Pop–Up Books and Cards*, I.S.B.N. 0906212499, 1986.

Y.T. Lee, B. et al., Mathematical modelling and simulation of pop–up books, Computers & Graphics, 20(1):21–31, 1996.

Paul Jackson, *The Pop–Up Book: Step–By–Step Instructions for Creating over 100 Original Paper Projects*, I.S.B.N. 0805028846, Apr. 1994.

Yannick L. Kergosien et al., Bending and creating virtual paper, IEEE Computer Graphics & Applications, 14:40–48, Jan. 1994.

Andrew Glassner, Interactive Pop–Up Card Design, Microsoft Research Technical Report, TR98–03, Jan. 16, 1998.

* cited by examiner

*Primary Examiner*—Kevin J. Teska
*Assistant Examiner*—Douglas W. Sergent
(74) *Attorney, Agent, or Firm*—Klarquist Sparkman, LLP

(57) ABSTRACT

An interactive development environment for design and placement of tiered geometrical objects, such as objects used in pop-up card designs. Relations between objects are represented mathematically, allowing computerized modeling and enforcement of design constraints. For example, in the context of pop-up cards, a card that cannot close will not be allowed. A dependency hierarchy is used to track different objects of a card. Card objects are instantiated as related to other card objects so that changes to one card object can be appropriately propagated to related objects. If all card objects are defined with respect to a base card, an entire card design can be animated by only adjusting, e.g., "opening" and "closing," the base card. A graphical interface provides drag-and-drop and manual forms of placing card parts. For drag-and-drop, design constraints can be used to automatically determine proper positioning of card pieces. Graphics can be associated with card parts, and such graphics are automatically adjusted, e.g., adjusting perspective, for proper viewing of the image on a particular card piece.

40 Claims, 13 Drawing Sheets

METHODS FOR DESIGNING POP-UP CARDS, AND CARDS PRODUCED THEREBY

FIELD OF THE INVENTION

The invention relates to the field of paper-folding. In particular, the invention relates to design and creation of pop-up greeting cards.

BACKGROUND

Manual (e.g., trial and error) paper folding techniques have been studied for hundreds of years. Recently, such techniques have been applied to the creation of greeting cards that unfold into complex shapes as the card is opened. FIG. 1 illustrates an example of such "pop-up" greeting cards. As shown, pop-up cards have an underlying base card 100 to which is attached several pieces 102 that move as the card halves 104, 106 are actuated (e.g., opened and closed) along a fold line 108. Although card pieces generally operate by being placed in combination with the fold line 108, FIG. 1 shows that remote (from the fold line) card pieces can be actuated through use of a tab 110 that can be affixed across the fold line to transfer the effect of actuating the card halves.

A problem with creating designs such as FIG. 1, however, is that determining proper placement of the card pieces 102, 110 is largely a trial and error procedure. That is, a designer generally conceives of a design, cuts out pieces, folds and glues them, waits, and then tests the resulting construction. If it doesn't look quite right, or operate correctly, the designer's only recourse is to re-cut the pieces with slightly different shapes, fold, glue, wait, and try out this second construction. Once again, if the pieces are not formed or placed correctly, the cutting and placement steps must be repeated until the design is eventually achieved (or the designer gives up). What is needed is a way to design and test a card before trying to construct it.

SUMMARY

The invention provides an interactive environment in which one can overcome the manual and inconvenient nature of traditional pop-up card design. In particular, through analysis of traditional paper-folding techniques and pop-up card designs, basic underlying designs and constraints have been identified for different classes of pop-up cards. These designs and constraints have been expressed as mathematical relationships describing the movement of different parts of pop-up cards. By expressing card designs as mathematical relationships between card parts, different designs can then be modeled with a graphical development environment.

In one such development environment, an object dependency hierarchy is used to track card parts. Card objects are instantiated as being dependent on other card objects, i.e., an object is defined relative to another object, and changes to a base object can be propagated to dependent objects. Thus, a card design can be visually animated by fixing all lowest level objects, e.g., those in contact with a virtual card surface, and then "opening" and "closing" the underlying virtual card. As the card is animated, each dependent object is redisplayed according to the state of the card. Alterations to objects propagate throughout the hierarchy.

Each pop-up card piece has a known set of limitations, such as limits on where the piece can be placed on a card, and limits on range of motion for the piece. The graphical interface enforces these restraints. An added benefit of known constraints is that the designer can allow the system to automatically determine piece placement values. For example, the designer can specify a desired presentation angle for a pop-up piece, and leave to the system to determine placement of the piece's base so that the desired presentation angle is achieved.

Once a design is approved by a designer, the card can be printed onto stock using techniques that reduce wastage. Each sheet of paper contains lines indicating where the pieces need to be cut, folded, or glued, as well as where and how the pieces are to be interconnected. The connectivity information can be color coded and/or otherwise labeled.

Figure 7:
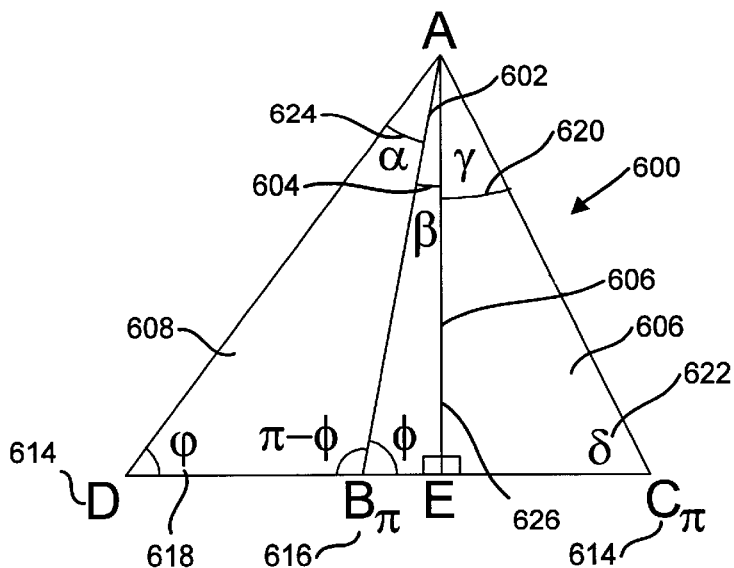
Figure 8:
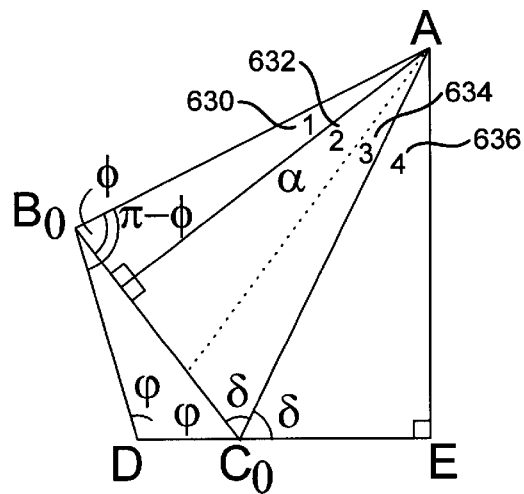
Figure 9:
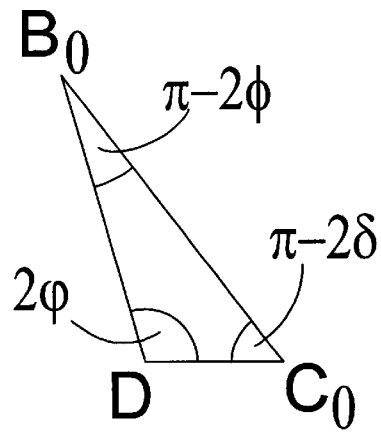

FIGS. 7, 8, and 9 illustrate geometrical relationships for asymmetrical single-slit mechanisms.

Figure 10:
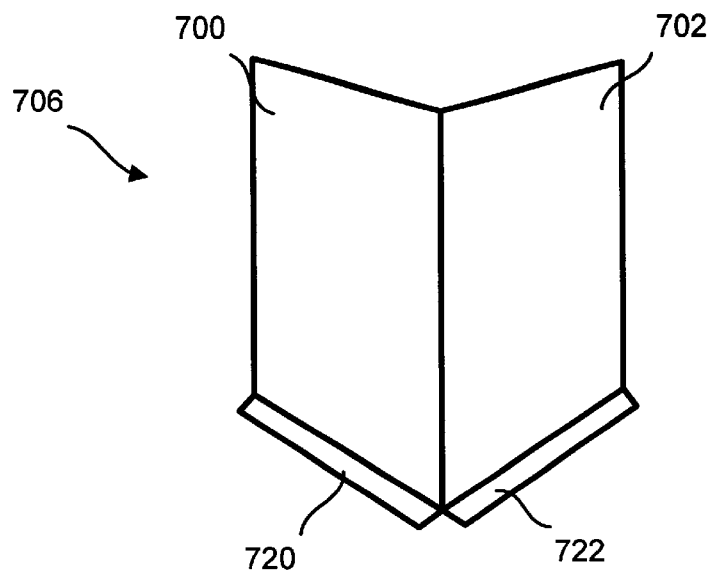
Figure 11:
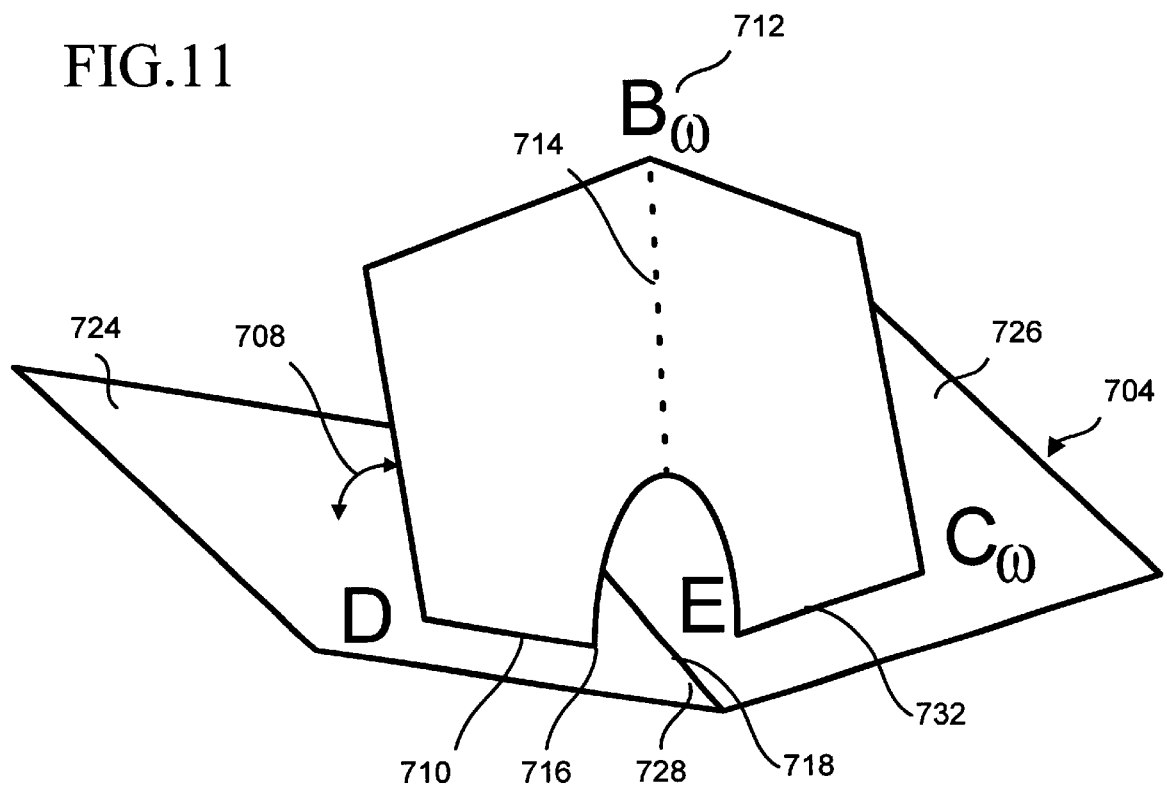
Figure 12:
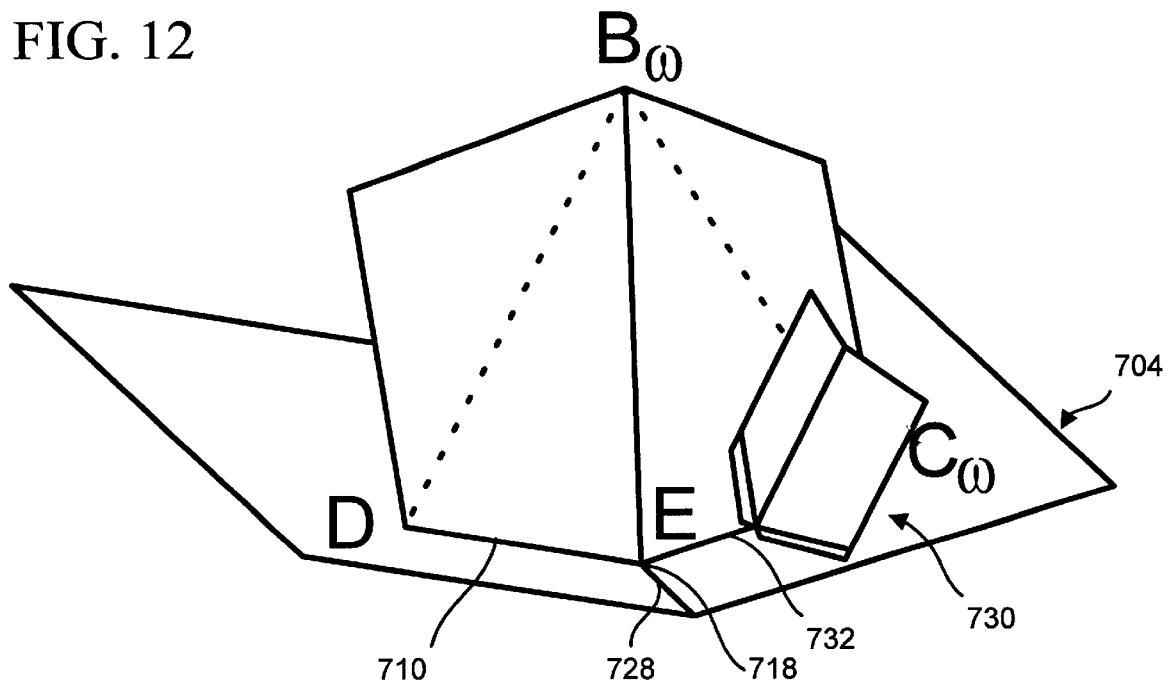

FIGS. 10, 11, and 12 illustrate V-fold designs.

Figure 13:
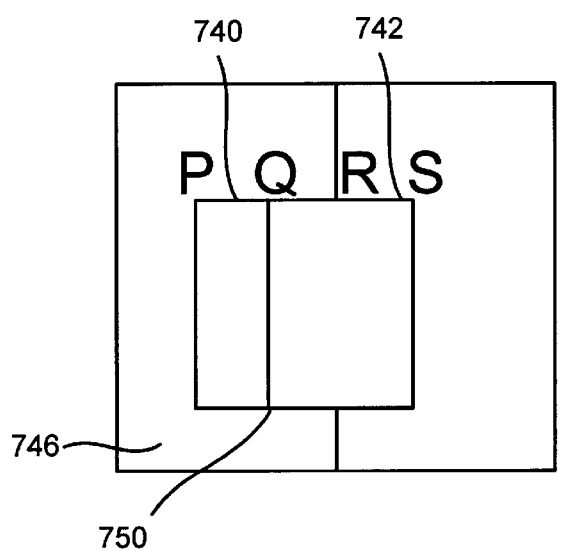
Figure 14:
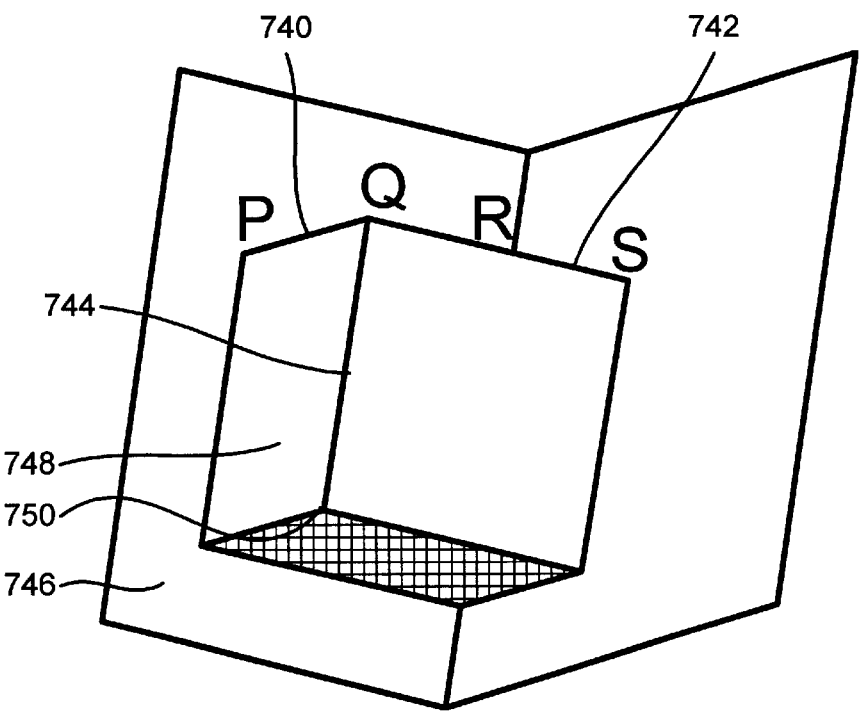

FIGS. 13 and 14 illustrate double-slit designs.

Figure 15:
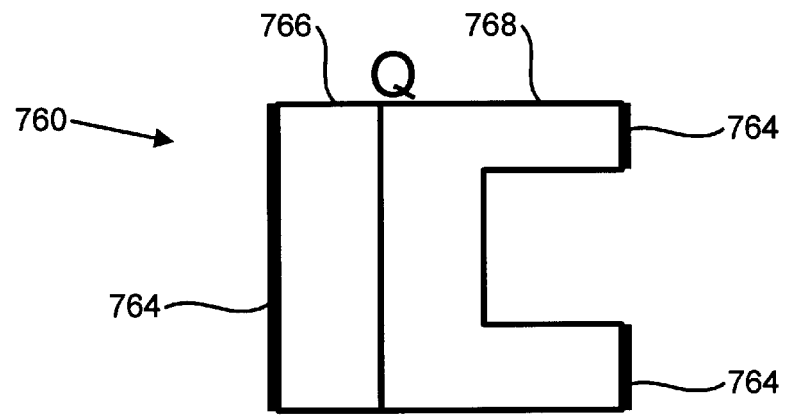
Figure 15:
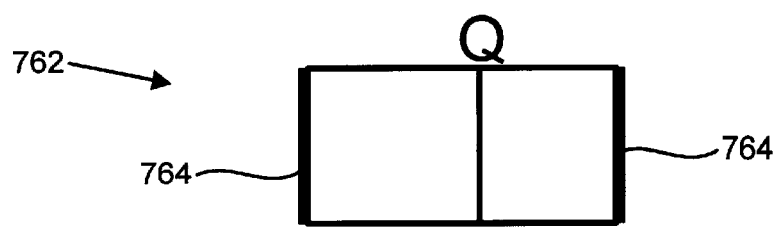
Figure 16:
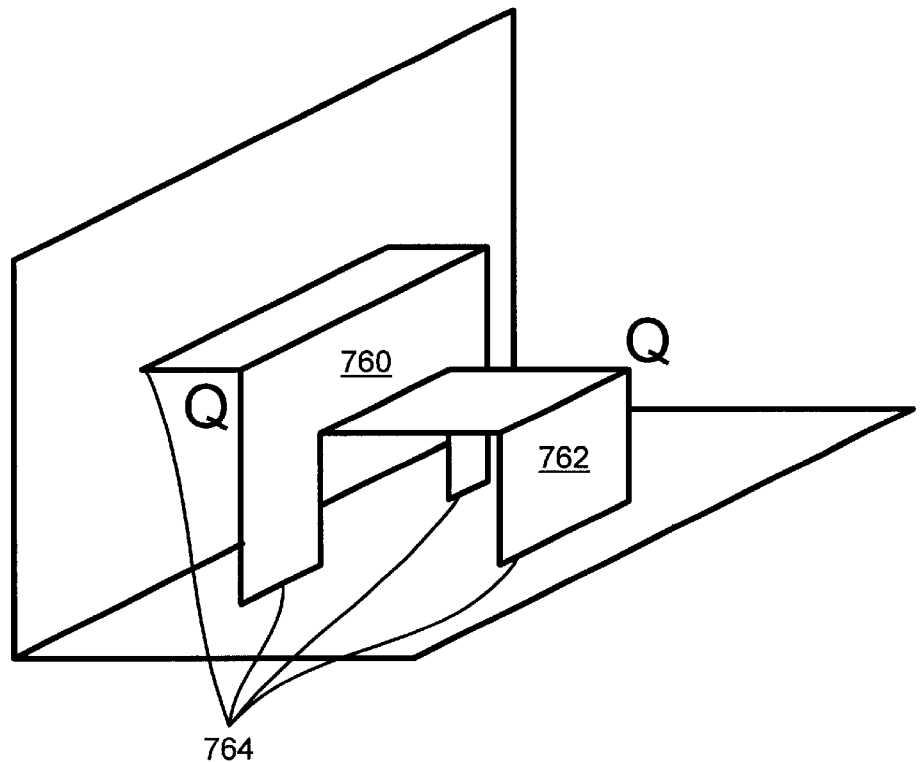

FIGS. 15 and 16 illustrate a layered variant of the FIGS. 13 and 14 double-slit design.

Figure 17:
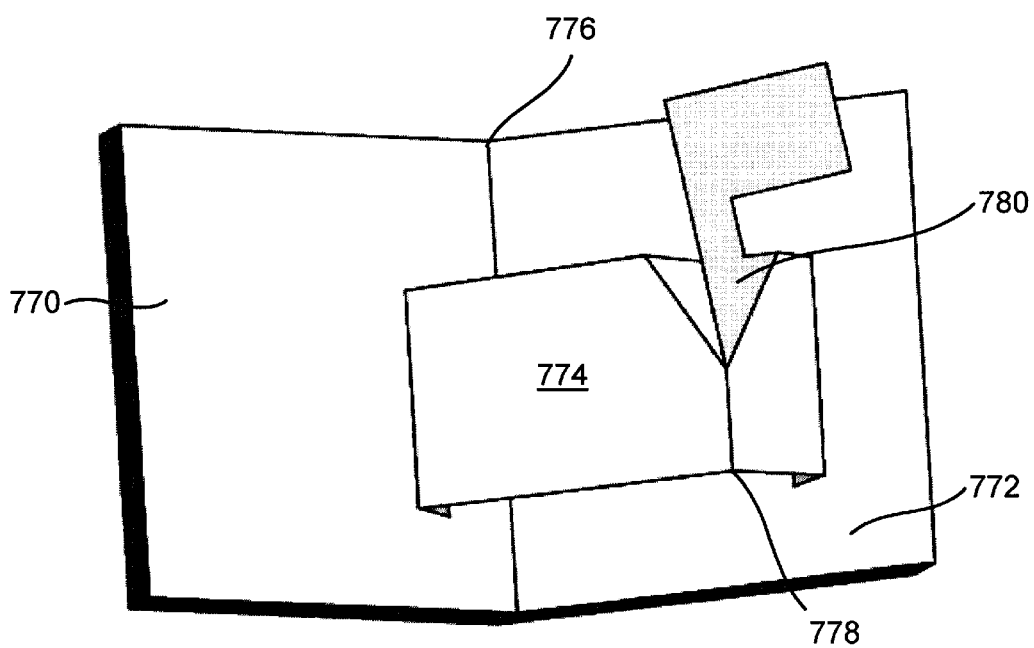
Figure 18:
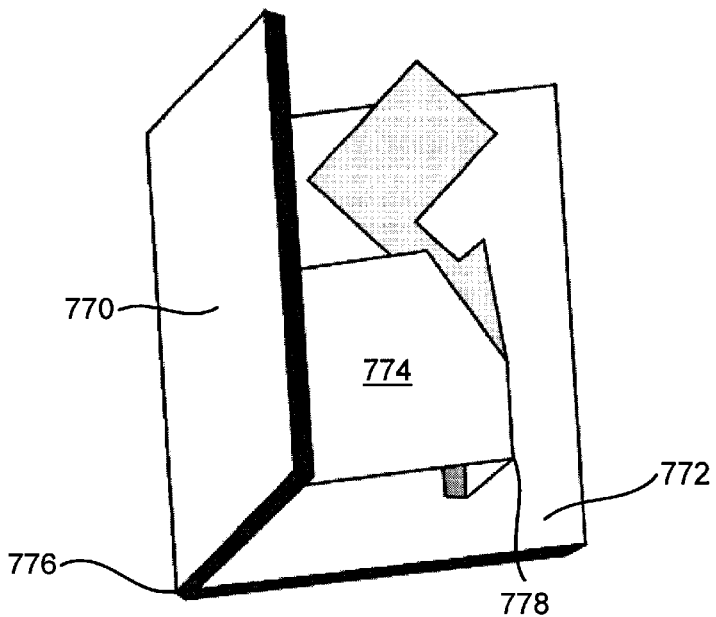

FIGS. 17 and 18 illustrate a strap and pivot variant of the FIGS. 13 and 14 double-slit design.

Figure 19:
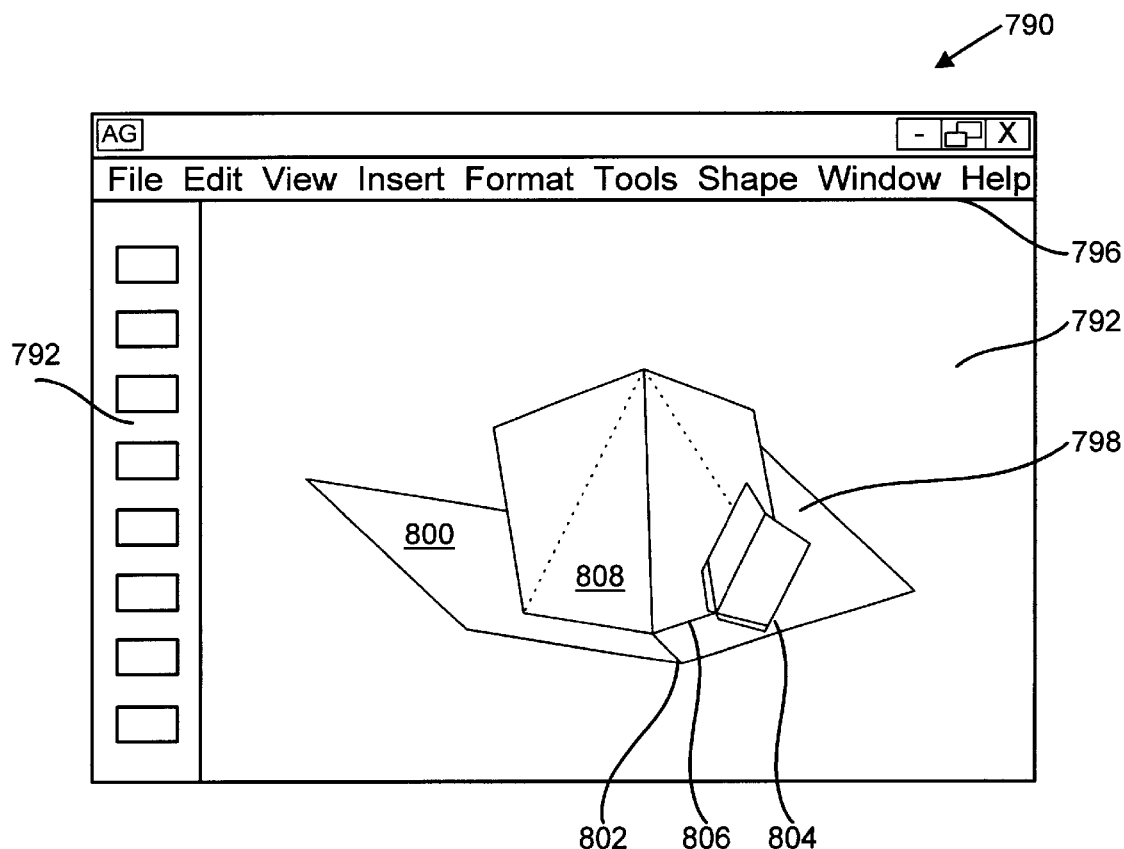
Figure 20:
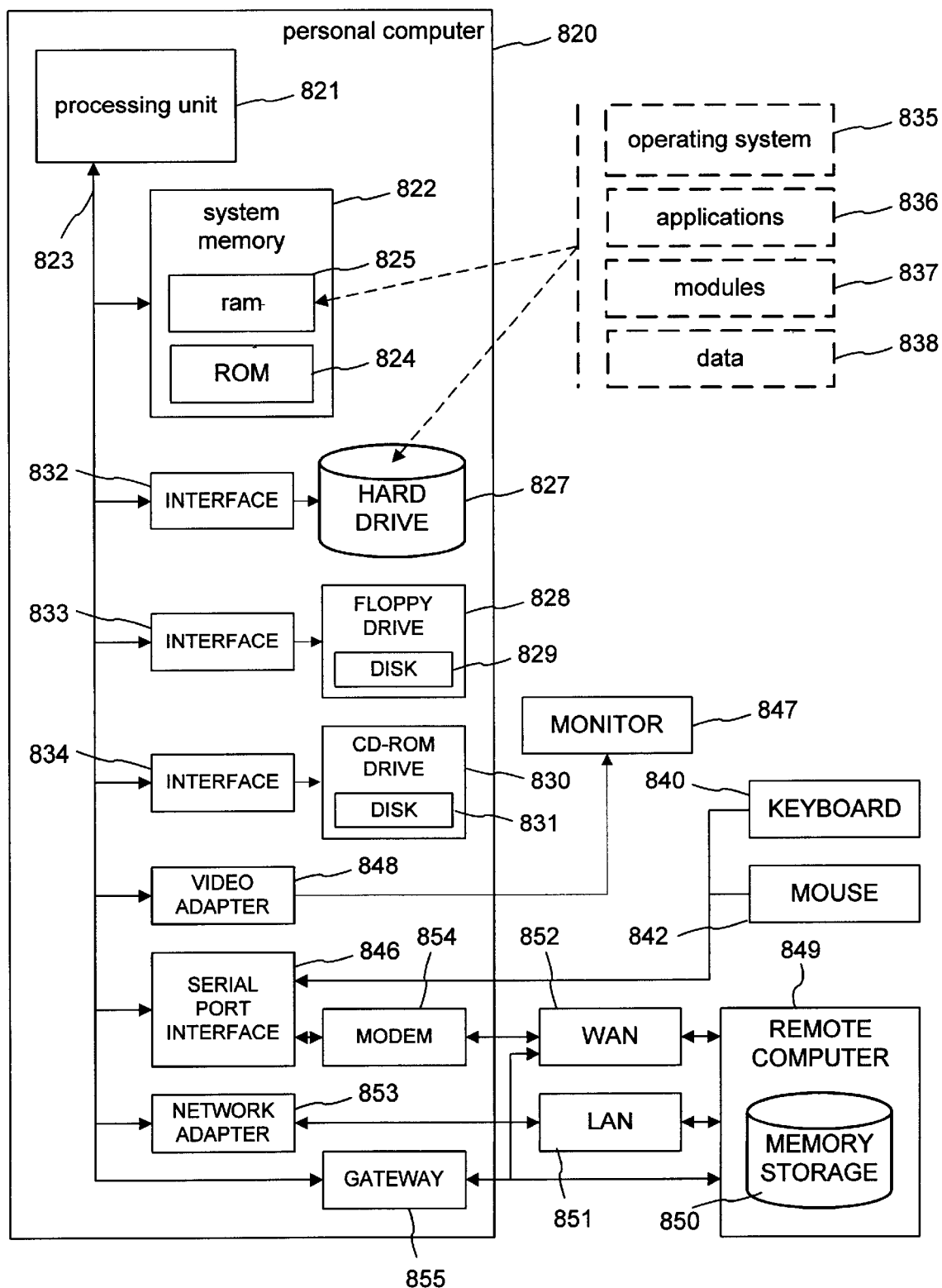

FIG. 19 illustrates the components of a simplified computer-aided design and simulation system FIG. 20 illustrates an exemplary operating environment suitable for implementing the invention.

DETAILED DESCRIPTION

Analysis of paper-folding techniques and pop-up card design reveals several basic designs and constraints underlying a large number of pop-up designs. These designs and constraints have been expressed as mathematical relationships explaining the movement of different parts of pop-up cards, and incorporated into a three-dimensional modeling system. Discussion focuses on designs which use moving planes driven by an opening pair of card pages, as these designs typically require the most trial and error before obtaining a properly working product. However, the principles discussed below are generally applicable to other designs as well.

Figure 1:
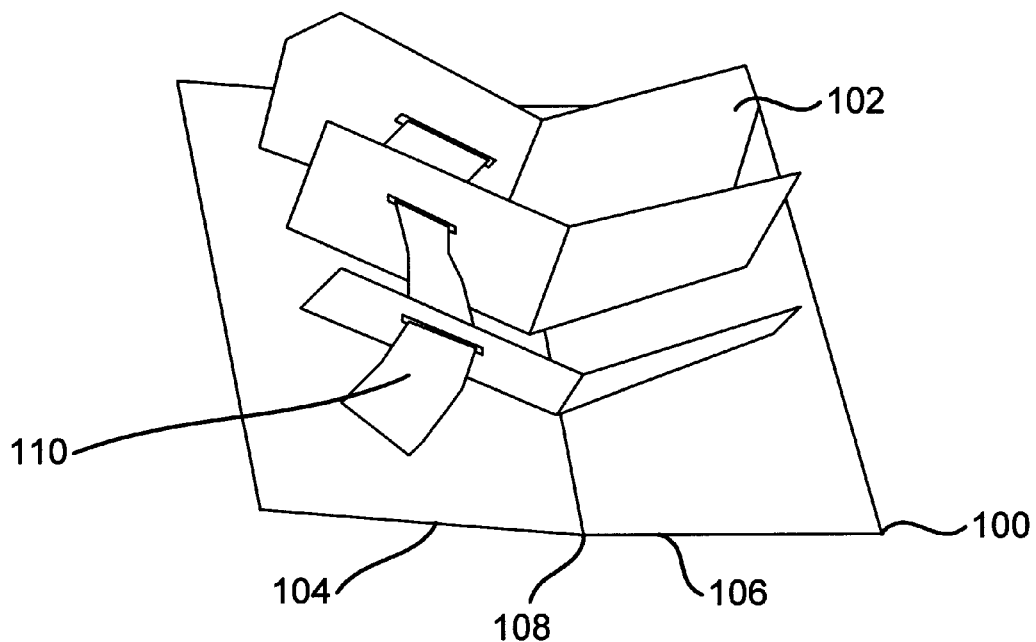
FIG. 1 illustrates a prior art manually-created pop-up card.

As discussed in the background, FIG. 1 illustrates a manually created pop-up card. The following figures and discussion concern design of such cards without trial-and-error experimentation.

In the FIG. 1 card, the pop-up features are at their presentation positions when the card is fully opened, with the two base leaves lying in the same plane. Other cards behave differently. In the card shown in FIGS. 2 and 3, for example, the pop-up feature is at its presentation position when the card is opened ninety degrees. When the card is fully opened, the pop-up feature lies flat with the two base leaves of the card.

Figure 2:
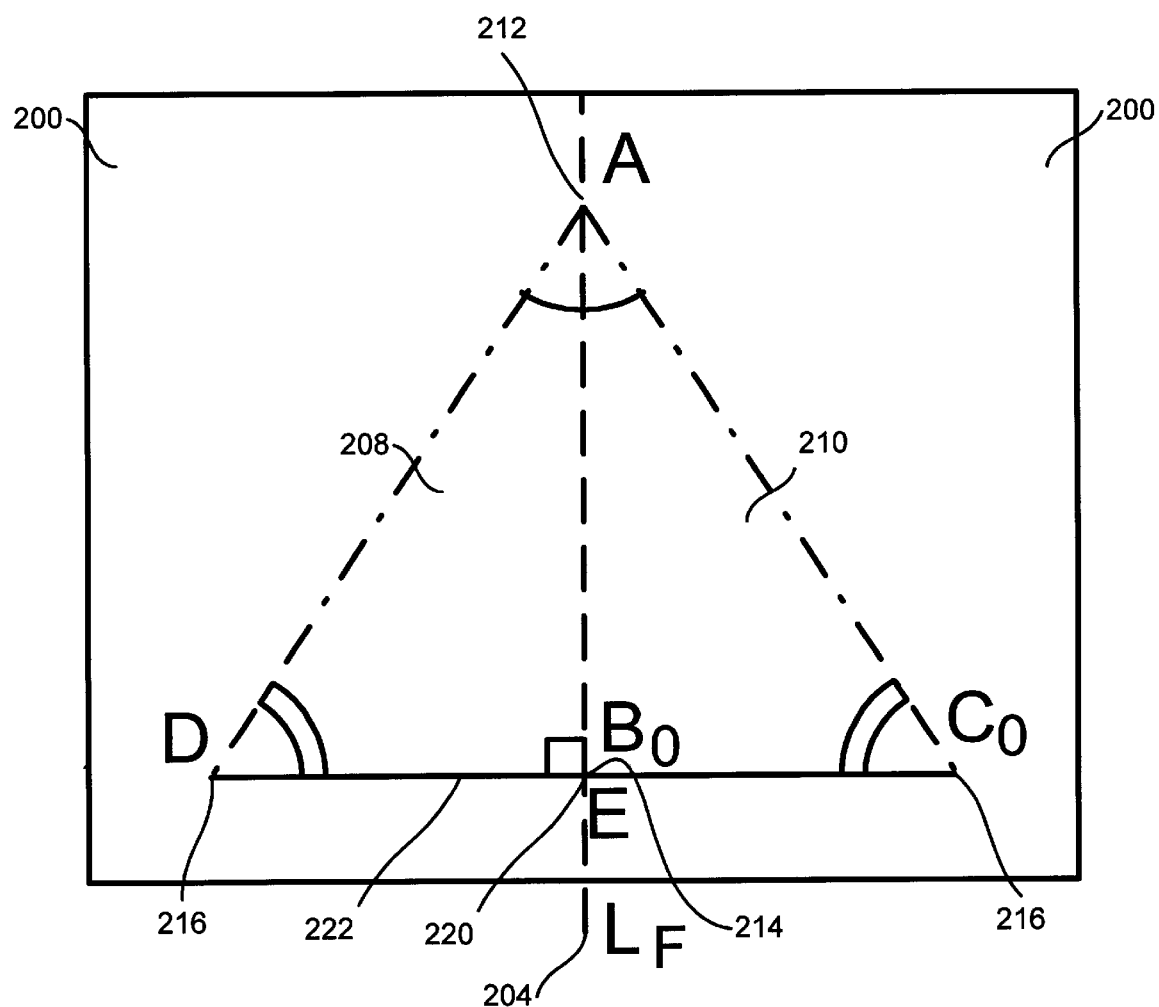
FIGS. 2 and 3 show a single-slit pop-up card design.
Figure 3:
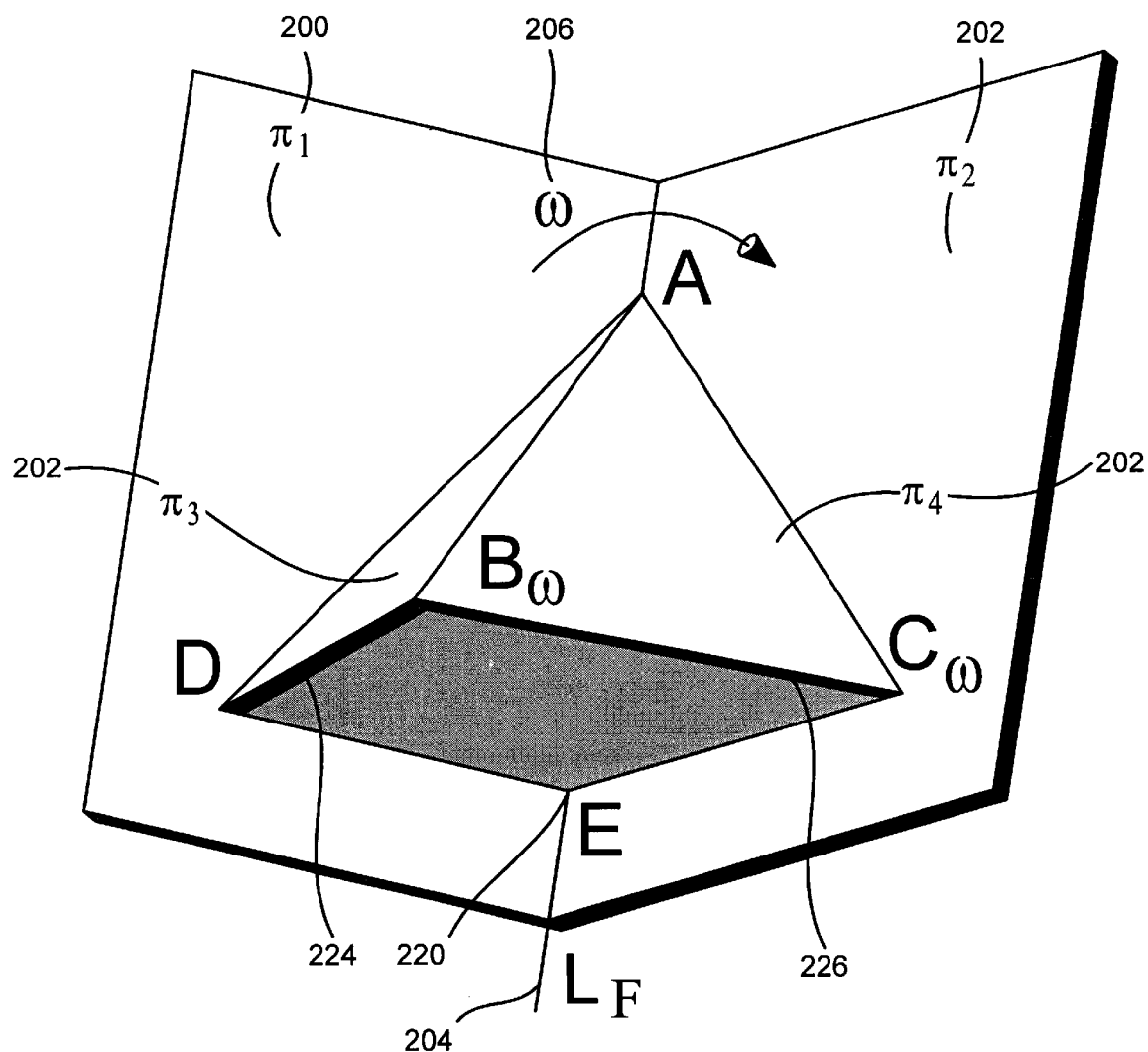

FIGS. 2 and 3 employ a single-slit design, one of the simplest pop-up designs. In the illustrated card, the pop-up feature is literally formed by cutting a single slit 222 across the fold line 204 of the card, resulting in a pop-up member that extends progressively further upward as the card halves are folded together. It should be recognized, however, that the same effect can be achieved by gluing a triangular piece of paper onto a separate base card—the geometry of the resulting pop-up is the same. (Glued constructions enable more design flexibility, as considered below in connection with V-fold designs.)

In more detail, the card of FIGS. 2 and 3 is formed of two outside planes $\pi_1$ 200 and $\pi_2$ 202, having a line of intersection $L_F$ 204. Line 204 is the support crease along which the card is folded. The angle between the planes is $\omega$ 206. Planes $\pi_3$ 208 and $\pi_4$ 210 form the pop-up itself, and move as the angle $\omega$ changes. For convenience, it is assumed that $\pi_1$ remains constant while $\pi_2$ changes, i.e., $\pi_{22}$ rotates around $L_F$ while $\pi_1$ is fixed.

The basic triangle has several points of interest that are discussed with respect to characteristics of the card itself. As shown, points A 212, B 214, C 216, D 218, and E 220 correspond to vertices defining a 3D-pyramid that can be thought of as "embedded" within more complex shapes. That is, although this discussion focuses on the geometry of this basic shape, more complex shapes can be interpreted as containing this basic structure. Consequently, the disclosed techniques are applicable to arbitrary pop-up shapes, e.g., mail-boxes, faces, or the like. In the illustrated card, lines A-D and A-C are fold lines; line D-C is a cut in the paper card itself. (Again, as noted, a separate triangular piece A-C-D could be glued to the base card along lines A-D and A-C with similar effect.)

For simplicity in presentation, let us presume that points A 212, D 218, and E 220 are fixed in place, and that point C 216 rotates around $L_F$ 204 by $\omega-\pi$, which is the negative complement of angle $\omega$. It is understood that this restriction is arbitrary as a card can be defined with respect to a virtual plane, in which both card halves $\pi_1$ and $\pi_2$ have angles of incidence to the virtual plane.

Assuming the restricted positions of A, D, and E, one can then define positions for B and C with respect to an angle $\omega$). Let such values for B and C be denoted as $B_{107}$ and $C_\omega$. Then, as shown in FIG. 2, since the card is opened flat, the angle is $\pi$, and B and C are thus depicted as $B_\pi$ and $C_\pi$. Points B 214 and E 220 therefore coincide at the same point. ($B_0$ and $C_0$ correspond to the card being fully closed.) Similarly, as shown in FIG. 3, points $B_0$ and $C_0$ are positioned at some location $B_\omega$ and $C_\omega$ which are defined according to arbitrary angle $\omega$; when the card is partly opened, points B 214 and E 220 do not coincide at the same point.

It is assumed that cut segment D-C 222 (FIG. 2) is perpendicular to fold line $L_F$ 204, and the position of $B_\pi$ is at the intersection of line $DC_\pi$ and AE 214. However, if this is not the case, $B_\omega$ is a point along the edge DC.

To automate production of pop-up cards, one can define a design problem as the determination of a position for point $B_\omega$ 214 for some angle $\omega$. Computer-assisted automation can allow a user to select a minimal set of card constraints, such as identifying numerically or graphically (through an appropriate user interface) the positions for a minimum subset of the points A-E, or angles of incidence between card components, or combinations of the two.

For example, if the location of points A, C, D, and E are known, then one can identify the position of $B_\omega$ for any $\omega$. As defined above, $C_\omega$ corresponds to point $C_0$ of FIG. 2 as rotated about $L_F$ by any angle $\pi_0$. It follows then that the lengths of segments A-$B_\omega$, $C_\omega$-$B_\omega$ and D-$B_\omega$ have fixed length irrespective of the value of $\omega$. If one defines three spheres centered on points A 212, $C_\omega$ 216, and D 218, with each sphere having respective radii of lengths A-$B_\omega$, $C_\omega$-$B_\omega$ and D-$B_\omega$, then $B_\omega$ is at the intersection of these spheres.

Figure 4:
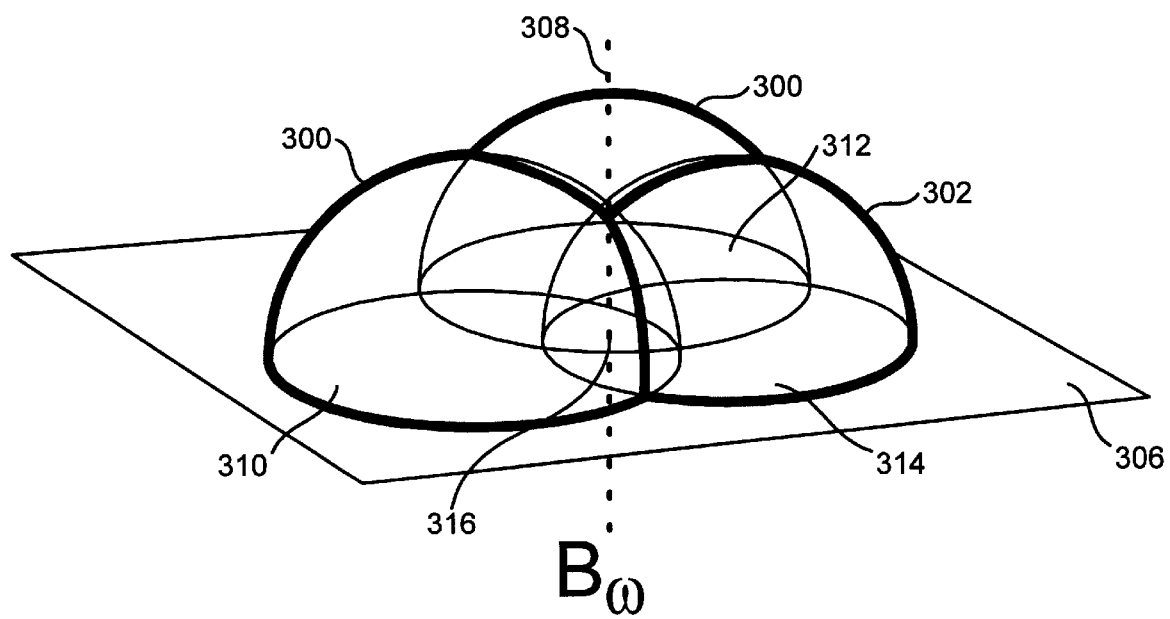
FIG. 4 illustrates three mutually intersecting spheres defined with respect to the FIGS. 2 and 3 design.

This may be made clearer by reference to FIG. 4. This figure shows a first 300, second 302, and third 304 spheres respectively centered on points A 212, C 216, and D 218. Since the lengths of segments A-$B_\omega$, $C_\omega$-$B_\omega$ and D-$B_\omega$ remain the same as $\omega$ changes (i.e., the card is opened), the point $B_\omega$ must be present on the surface of each of the three spheres 300–304. It is known from geometrical analysis of FIG. 4 that the three mutually intersecting spheres 300–304 meet in two common points.

Three mutually intersecting spheres meet at two common points, where the value of the sphere equations at those points is zero. As illustrated in FIG. 4, a plane 306 passes through the centers of the spheres (this plane is not necessarily the base for the pop-up card). The dashed line 308 is perpendicular to the plane 306 and passes through the two intersection points for the spheres. If we consider line 308 to be perpendicular to the plane 306 and passing through the intersection points of the spheres, then there are two values for $B_\omega$, namely +$_\omega$, and –$B_\omega$. We determine +$B_\omega$ (hereafter just $B_\omega$), since either point can be found by simply reflecting the other through the plane 306.

To find $B_\omega$, we look to that portion of the spheres that is intersected by the plane. That is, the three-dimensional problem can be partially solved by viewing the intersecting regions of the spheres as three overlapping two-dimensional circles 310, 312, 314 that lay on the plane 306 itself. This allows one to identify a point M 316 lying at the intersection of the plane and axis line 308.

To find M, we identify the locus of all points that have the same value with respect to two circles. That is, we want to identify all points P on two circles U and V such that U(P)=V(P). This is equivalent to stating that we are solving for U(P)–V(P)=0. We note that the equation for a circle C with center ($C_x$, $C_y$) and radius $C_r$ is $C(x,y)=(x-C_x)^2+(y-C_y)^2-C_r^2$. Using this equation for the circle C, for a point (x,y), we want to solve:

$$0 = U(x, y) - V(x, y)$$
$$= 2x(V_x - U_x) + 2y(V_y - U_y) + U(0, 0) - V(0, 0)$$
$$= Ax + By + C$$

All points (x,y) satisfying this relationship lie on a line called the radical axis. Since we have three circles, there are three radical axes. The intersection of all three axes is the point M.

Figure 5:
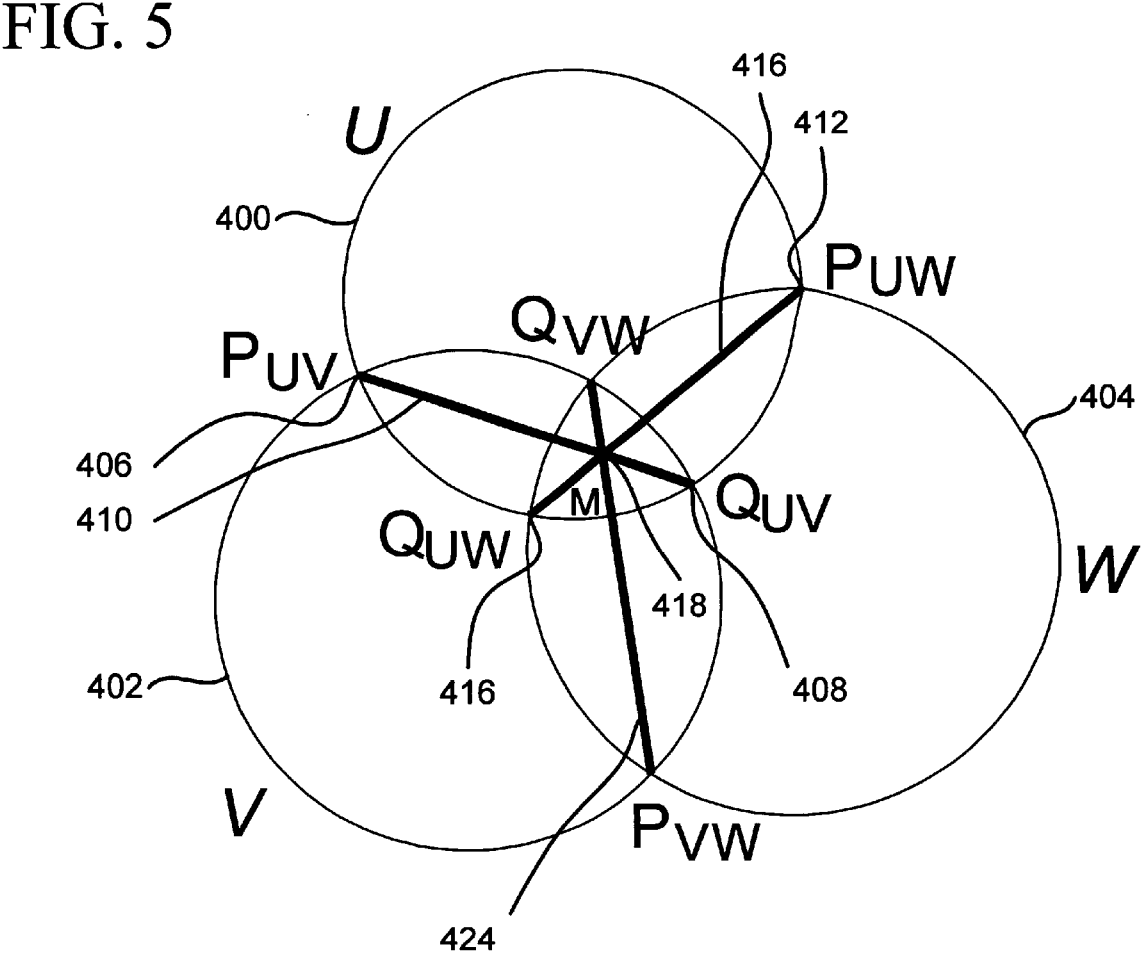
FIG. 5 shows three mutually intersecting circles defined by a plane passed through the centers of the spheres of FIG. 4.

FIG. 5 shows three mutually intersecting circles U 400, V 402, and W 404 of different radii. These circles correspond to a two-dimensional approach to solving the three-dimensional sphere intersection of FIG. 4.

Circles U and V meet in two points $P_{UV}$ 406 and $Q_{UV}$ 408. As discussed above, both points have a value zero for both U and V, and these points determine a radical axis $L_{UV}$ 410. Similarly, circles U and W meet at points $P_{UW}$ 412 and $Q_{UW}$ 414, and they determine a second radical axis $L_{UW}$ 416. And, circles V and W meet at points $P_{VW}$ 420 and $Q_{UW}$ 422, thus determining a third radical axis $L_{VW}$ 424. Since the three circles have been defined as mutually intersecting, axes $L_{UW}$, $L_{UV}$, and $L_{VW}$ 424 are not parallel. (If the circles did not intersect, the axes would be parallel.) By virtue of being non-parallel, it is known that any two of the axes intersect at some point. Thus, each of the radical axes mutually intersect at the same point M 418, as will become further evident from the following.

Figure 6:
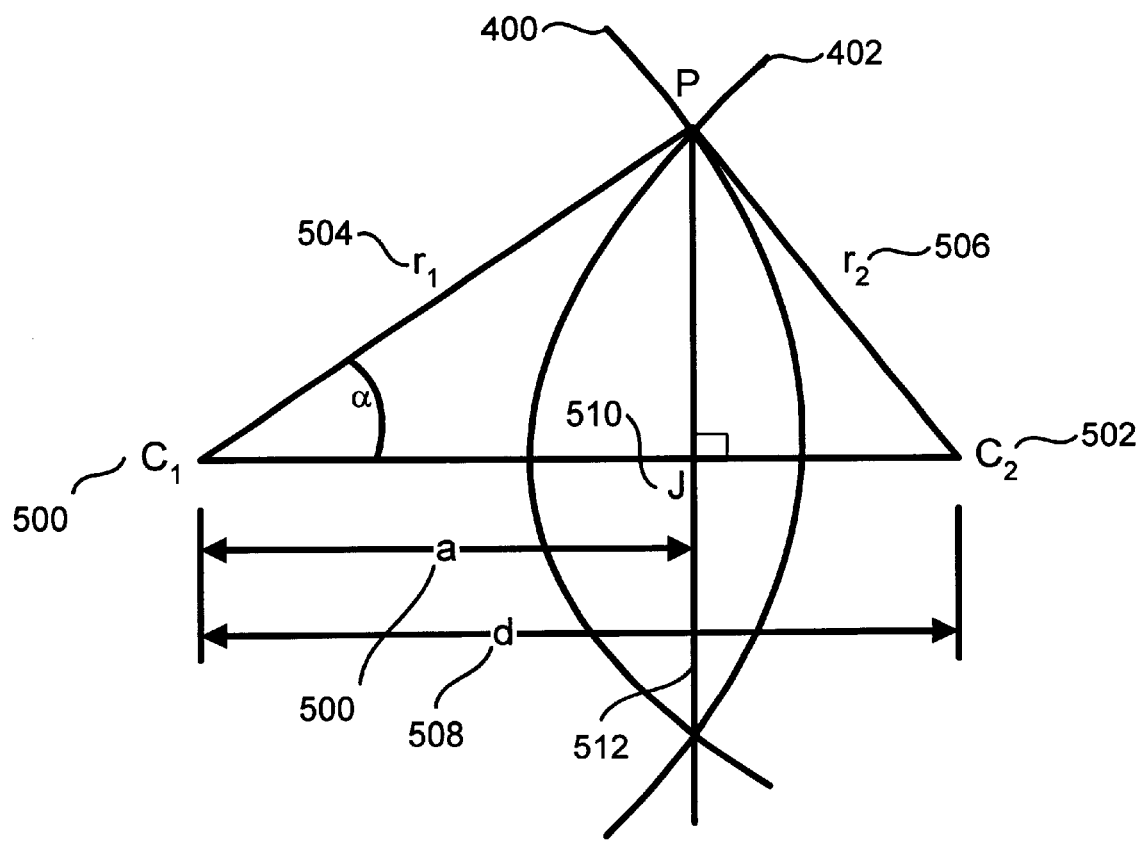
FIG. 6 illustrates geometrical relationships defined by the intersection of two FIG. 5 circles.

FIG. 6 illustrates geometrical relationships defined by the intersection of two FIG. 4 circles. The illustrated geometry underlies an analysis proving that a point M 418 is a mutually common intersection point for each of the radical axes 410, 416, 424. To prove this, one can define a plane for each radical axis, where each plane is perpendicular to, or coming out of, the page. That is, for the plane containing axis $L_{VW}$ 424, if the plane were of finite width, the "edge" of the plane would visually coincide with the arc defined by $P_{VW}$ 420 and $Q_{VW}$ 422. To determine one such plane, determine two circles centers $C_1$ 500 and $C_2$ 502 having radii $r_1$ 504 and $r_2$, 506 where d 508 is absolute value of $C_1$–$C_2$, which is the distance between the two center points. We want to identify the location of point J 510, as J lies on the radical axis $L_{UV}$ 410, and from J we can determine the intersection points defining the axis.

To do so, define a first triangle from the points P, J, and $C_1$. For this triangle, we know that distance a=$r_1$ cos α. If we define a second triangle from $C_1$, P, and $C_2$, by the law of cosines, we know that cos α=$(d^2+r_1^2-r_2^2)/(2r_1 d)$. Therefore, J=$C_1$+($C_2$–$C_1$)(a/d), where "/" represents a division operation. More compactly, J=$C_1$+($C_2$–$C_1$)$(d^2+r_1^2+r_1^2)/(2\ d^2)$. The plane we are defining passes through J, with a normal for the plane being parallel to $C_2$–$C_1$. Intersecting the planes for any two of the radical axes results in the dashed line 308 (FIG. 4) which passes through point M 418 (item 314 of FIG. 4).

From the equation for this line 308, the line can be intersected with one of the spheres 300, 302, 304. This intersection results in identification of two points, namely +$B_\omega$, and –$B_\omega$ discussed above for FIG. 4. The $B_\omega$ of interest (e.g., +$B_\omega$) is the one on the same side of the plane $\pi_1$ 200 as point $C_\omega$ when ω<π (see FIG. 3).

Asymmetric Single-Slit Designs

Analysis of myriad different origami and pop-up card designs reveals that most designs can be abstracted back to an attempt to solve some variant the above single-slit design problem. In other words, a basic embedded pyramid can be construed as present, in modified form, in most designs. One example of a variant of the single-slit design is the asymmetric slit. In an asymmetric slit, the fold does not follow the crease of the backing card, but is inclined relative to the crease.

FIGS. 7, 8, and 9 illustrate geometrical relationships for asymmetrical single-slit mechanisms. FIG. 7 shows an open card 600, and FIG. 8 shows the card when it is closed. In FIG. 7, the central pop-up crease $AB_\pi$ 602 forms an angle β 604 to the support crease AE 606. Although when actuated the card looks (generally) like FIG. 3, the central pop-up crease 602 is rotated, creating an asymmetrical pair of triangles 606, 608 on each side. In FIG. 7, one can freely select values/positions for A 610, D 612, and $C_\pi$ 614 (regarding selection, see discussion below regarding computer-assisted design). Given a particular configuration for A, D, and $C_\pi$, we want to identify a $B_\pi$ 616 that allows the card to fold flat. (As for the above discussion for finding $B_\omega$, any of the values can be designated as the one for which a value needs to be determined.)

Recall that a pop-up card is designed so that there are various shapes which are stored in a flat configuration while the card is "closed" (either with the leaves folded onto each other, or lying adjacent in the same plane), but which subsequently pop up as the leaves are moved from such closed position. As shown in FIGS. 7, 8 and 9, we have angles φ 618, γ 620 and δ 622, and we wish to track α 624 as the card is actuated. If one visualizes operation of the card, the point $B_\pi$ rises out of the plane and comes to rest at location $B_0$. This movement causes triangle $ADB_\pi$ 608 to reflect since $B_\omega$ pulls the triangle around segment AD. During closing, triangle $AB_\pi C_\pi$ is also pulled along by the motion of $B_\omega$, and this triangle comes to rest at triangle configuration $AB_0 C_0$. Triangle $AB_0 C_0$ is in an orientation corresponding to a rotation by γ around A. Note that segment $EC_\pi$ is perpendicular to the folding axis AE 626, and therefore point $C_\pi$ moves to $C_0$ (FIG. 8) along segment DE. Thus, triangle $AC_0 E$ is similar to triangle $AC_\pi E$.

Given these relationships, we can identify α. By the sum of interior angles, we know that for triangle $B_0 C_0 D$ (FIG. 9), π=2φ+(π−2δ)+(π−2φ), which simplifies into 2φ=2φ+π−2δ, which simplifies into

φ=φ−δ+(π/2).

By similar analysis, for triangle $ADB_\pi$,

π=α+φ+π−φ, which can be rewritten as

α=φ+π−π−φ, and simplified into

α=φ−φ.

Substituting the value of φ for triangle $B_0 DC_0$, we get

α=(φ−δ+(π/2))−φ, which can be rewritten as

α=φ−φ+(π/2)−δ, and simplified into

α=(π/2)−δ.

Applying a similar analysis, from triangle $AEC_\pi$, we know that

δ=(π/2)−γ, which when combined with the previous result, yields

α=(π/2)−((π/2)−γ), which can be rewritten as

α=(π/2)−(π/2)+γ, which simplifies into

α=γ.

Therefore, to construct an asymmetric slit pop-up that folds flat when the card is closed, it is necessary to place $B_\pi$ (in FIG. 7) such that α=λ. This constraint in placement can be modeled and enforced by an interactive design system such as the one described below.

As illustrated in FIG. 8, angle β is angle no. 1 (item 630), angle α is angle nos. 1,2 together (items 630, 632), and angle γ is both angle nos. 2, 3 together (items 632, 634), as well as angle no. 4 (item 636).

V-Fold Designs

FIGS. 10, 11, and 12 illustrate V-fold mechanisms. As with the single-slit designs, many different folding designs are just complex variations on a V-fold. Consequently, a software program can aid in the visualization and development of many complex designs, while internally only having to recognize and apply the constraints for a traditional V-fold design.

As shown in FIG. 10, a V-fold mechanism creates a pair of free-standing slanted planes 700, 702 when a card 704 (FIG. 11) is opened. The V-fold is one of the most difficult designs to effect when manually laying out placement of card pieces. The design is difficult because the degree of lean to a pop-up piece 706 is controlled according to the angle 708 set for the base 710 of the piece 706.

Because a V-fold is a separate piece that is physically attached to a backing card, it can rise out of the card plane when the card is fully open. This contrasts the single-slit design (see FIGS. 2 and 3). Thus, even though the geometry of the V-fold is based on that of the single-slit discussed above, the separate pieces allow for more flexible designs. As with the single-slit design, $B_\omega$ 712 determines the central crease 714. However, unlike such designs, it is not necessary that there actually be any physical paper at $B_\omega$'s position in space. $B_\omega$ can be a virtual point. That is, the mathematical position of $B_\omega$ is created by the triangles in the figure, though the card material does not necessarily extend that far.

Similarly, point E does not need to be actually included in the physical card either, though its location is mathematically unambiguous.

For example, FIG. 11 shows a tunnel 716 running through (i.e., cut out of) the pop-up piece 706. Even though the apex of the fold is point E 718, a point having no physical paper, nevertheless the constraints discussed for single-split designs can still be applied to properly position control points for the pop-up card.

FIG. 10 also shows small flaps 720, 722 which are scored, bent forward or back, and then glued to the support planes 724, 726. Since V-folds do not require a cut to be made within a card's underlying material, V-folds can be placed on any crease 728. This crease is then treated as if it were a main actuator crease (see FIG. 2, item $L_F$), and card design is restrained so as to ensure proper pop-up actuation around crease 728.

FIG. 12 illustrates an example of cascading a second V-fold 730 around the crease 732 formed between the first V-fold 706 and the base card 704. Here, the larger V-fold 706 uses the card's 704 center fold 728 as its support crease, and creates $EC_\omega$ 732 as the support crease for the second V-fold 730. As with the larger fold, the smaller fold can itself be used to support another fold, so that a chain of dependent folds is created. Depending on the placement of the V-fold on the support planes, the fold can be designed to fold either towards or away from the viewer. When the planes of the V-fold become parallel to the support planes, all the folding lines become parallel to one another. This configuration is sometimes called a floating layer. (For more information, see Mark Hiner, *Paper Engineering*, Tarquin Publications (1985); and Lee et al., *Mathematical Modeling* and *Simulation of Pop-Up Books*, Computers & Graphics, 20(1) :21–31 (1996). The artisan is presumed to be familiar with the contents of such writings.)

Double-Slit Designs

FIGS. 13 and 14 illustrate double-slit designs. The double-slit mechanism is based on cutting away a piece of the backing card, and then folding it towards the reader rather than away. FIG. 13 shows an example where a new fold is placed such that when ($\omega=\pi/2$, the pop-up forms a right-angle with the underlying card. That is, in FIGS. 13 and 14, segments PQ 740 and RS 742 are of equal lengths, and when the card is actuated as shown in FIG. 14, edge Q 744 rises off the surface of the card 746 so as to define a three-dimensional box 748. Of important note is that the leading point 750 of the double-slit design behaves as if it were point $B_\omega$ of FIG. 3.

FIGS. 15 and 16 illustrate a layered variant of the FIGS. 13 and 14 double-slit design. Layered mechanisms are a variation on the double-slit, where rather than being cut out of the backing card, the pieces 760, 762 are instead independently built and glued in place using mounting tabs 764. However, as with double-split designs, a fold is placed such that when $\omega=\pi/2$, the pop-up forms a right-angle with the underlying card. Also, the corresponding segment 766 to PQ 740 (FIG. 13) is equal in length to the corresponding segment 768 to QS (FIG. 13).

As should be clear from this common variant to the double-slit design, an intrinsic difficulty with these designs is that the pieces have to be carefully cut out and properly mounted on the base card—or the design will not work. (Traditionally these designs require a significant amount of measuring, marking, and guessing.)

FIGS. 17 and 18 illustrate combining different pop-up techniques. Two of the most useful combinations are called the strap and the pivot. The strap is based on either a double-slit (FIGS. 13 and 14), or a layer (FIGS. 15 and 16) glued to its support planes 770, 772. As discussed above, both the double-slit and the layer designs are right-angle mechanisms. When the card is fully open these pieces fold down into the plane of the underlying card. Through use of a strap 774, a card designer may displace the central card crease 776 to an arbitrary parallel location 778.

For example, as shown, the fold of the strap has been combined with a single-slit mechanism 780. This slit does not actually have to be cut in the card base as it is using the edge of the card. When the card is actuated, the strap's central pop-up crease 778 rises toward the viewer. When a single-slit construction uses the strap as its support crease, the pyramid created by the single-slit folds away from the reader. By attaching another piece 780 to one of the planes of the single-slit, that piece pivots as the card is opened.

Creative designers can create pivot elements that extend far outside of the card when it's opened, yet still fold down and tuck away completely out of view when the card is closed. And, if cords, rubber-bands, or springs are used in lieu of the strap, even more complex remote activity may be achieved on a particular card.

Computer-Aided Simulation and Design

As discussed above, a study of different pop-up card designs reveals that many are variants of the designs (and their associated constraints) disclosed herein. That is, most designs are some combination of single-slit, double-slit, V-fold, layered, and strap designs. By discovering geometrical constraints governing these designs, one can provide a computing environment in which virtual cards are designed and tested without ever having to attempt physical production of a card until a design is approved.

The above-discussed theoretical bases for the detailed design methodology are also reviewed in Microsoft Research Technical Report TR 98-03, entitled "Interactive Pop-Up Card Design" by the present inventor, attached as an Appendix hereto.

FIG. 19 illustrates the components of a simplified computer-aided design and simulation system. In particular, a user can be presented with a graphical user interface 790 that shows a main working area 792, along with one or more toolbars 794 and/or menu systems 796 for selecting and configuring a pop-up card 798. It is expected that the toolbars and menus are customizable so as to allow inclusion or removal of features as needed or desired. And, even though attention is directed to these two interfaces, it is expected that other interfaces may be used, e.g., 2D and 3D graphics tablets, pens, or by interaction with a virtual reality environment. Additionally, it may be useful to store input and design sequences for scripted playback.

Since the cards and their associated pieces are essentially basic geometrical shapes, a designer can use the provided tools to indicate the size and shape of and underlying card structure 800. On this underlying structure, one or more crease folds may be indicated 802. With placement of at least one fold, the designer can also select and place any available pop-up construction. As discussed above, however, the invention allows card construction details to be implied by use. For example, it is not necessary that the designer first create the card's major crease. One can just drop a pop-up on to the card, thereby causing an appropriate crease to be defined on the card structure. Similarly, given a pre-existing card crease and pop-up, the designer could drag a second pop-up 804 near a crease 806 created by the first pop-up 808 and the card surface 800. This second pop-up is 804 automatically cascaded off of the first 808. In this way, one can easily produce multi-layered designs that are known in advance to operate properly.

However, such automatic features can be disabled or ignored, allowing manual placement by setting explicit values. Explicit values can be determined by associating coordinates with the display area and having the user enter placement values, by snapping elements to a grid, or by inferring values based on constraints such as a desired pop-up angle for a particular component.

One method for implementing the user-assist features of the invention is to build a dependency graph, starting with the underlying card's dominant fold (irrespective of whether it is manually defined or implied by placement of a piece), and then working outwards. By virtue of the physical nature of pop-up cards, this graph is inherently acyclic.

As discussed above, different pop-up pieces can be attached to the main fold, and by straps and layers, complex object relationships may be defined. However, since each object is necessarily cut out of or stuck on top of another piece, a graph is able to track the interrelations of all card pieces. Depending on the implementation environment, e.g., coded in hardware or programmed in software, or a hybrid of the two, the storage and format of the data structure may change to suit a particular implementation.

Since each card piece is well defined, i.e., having control points A, B, C, D, and E (see FIGS. 2 and 3) defining where the piece is located in card-space (i.e., some coordinate system relevant to the card), card constructions can be animated so as to show the effect of opening and closing a card on a particular design. In addition, a user may also request that card elements be automatically moved within allowed (known) constraints, so that different piece-placement configurations can be viewed while the card is being opened and closed. Because all pop-up design constraints are known, animation accurately displays a card within the constraints.

For example, as discussed for single-slit designs (FIGS. 2 and 3), interactive adjustment of $B_\omega$ is limited to the plane that includes $L_F$ and that is perpendicular to line segment $C_\omega D$. That is, the limits on the motion of $B_\omega$ are given by the size of the card. Values for $B_\omega$ are restricted to be within the range where the three circles of FIG. 5 (items 400, 402, 404) in the plane (FIG. 4, item 306) overlap. Available values for $B_\omega$ constrain possible locations for the other points A, C, D and E. Thus, a designer is allowed to move the position of A, or the positions for $C\omega$ and D together. Single-slit design is also limited by the necessity that the point J 510 exist.

Similarly, V-fold designs (FIGS. 10, 11 and 12) have constraints peculiar to these designs that can be exploited by the user interface. In particular, as discussed, proper placement of flaps 720, 722 is required to ensure that the card can properly opened and folded closed, but placement is a difficult problem. With the graphical interface, however, since a user may select and move points (or the entire mechanism), the problem of designing a pop-up V-fold at a specific angle becomes trivial (for the user). To cause a V-fold piece to lean back at a shallower angle, the user need only select any point on a crease, and move it interactively until it looks "good".

Unassigned values are implied. Since each design has known constraints, a user can explicitly place certain points, or set relationships between some points (e.g., angles of incidence or distances between points), and allow automatic selection of values for unassigned parts of a card. A heuristic can be employed to "intelligently" select values according to traditional card designs, such as selecting a pop-up angle of about 45 degrees by default.

When animating a card design, motion of pieces can be tracked by representing all planes as triangles; more complex polygons can then use the triangles as a reference coordinate system. For example, mechanism points can be expressed as Barycentric coordinates defined with respect to the support planes in which they lie. When rendering a design that includes a horizon on one or more V-folds, a viewing perspective is selected so that the horizon is rendered straight and parallel to the base when the card is open, where the horizon is viewed from a position parallel to the base. Setting this perspective may require adjustment to textures that have been placed on card pieces. Similarly, textures may be adjusted so as to appear correctly as the card is animated. For example, in the context of a V-fold, texture on a V-fold is moved along the crease either towards or away from point E (FIG. 11).

In addition, a designer may apply horizon-lines to an entire card, or to only selected pieces. For example, one application for horizon lines is the application of a stereo viewing algorithm which groups objects from multiple photographs into multiple planes.

A collision detection algorithm is also incorporated into the object hierarchy that tracks placement of objects on the card. That is, just as there are constraints on placement of the control points defining a particular piece, physical constraints such as preventing overlapping card pieces is also provided. One such feature of collision detection is automatically placing a pop-up piece at a proper depth on the card—during initial placement, such that each new element is stacked one layer "closer" to the card viewer. In addition, provision is made to allow for curved surfaces on which to design and place pop-up structures, although the usefulness of such structures is limited to the capabilities of available output mediums.

Hard-copy Output

If the designer approves of a current design, the system can prepare a printout indicating how to cut out and attach various card pieces. In effect, the current card design is disassembled and the individual pieces are laid out "flat". Sheets of paper are then printed that contain cut and glue indicators. These indicators show, by color and/or numeric designation, the correct combination and placement of card pieces required to reproduce the current design. Additionally, detailed instructions can be generated which explain a suggested ordering of card production, as well as other technical suggestions relevant to the task.

Regarding the printing process itself, it is advantageous to efficiently pack elements corresponding to a card onto as few sheets of paper as possible. This is especially important in commercial contexts, as frequent replacement of paper might be impracticable.

One approach, for packing purposes, is to maintain a bounding rectangle about each card piece—call such an enclosed piece a "block". Each block is sorted by size, and for a given page, the largest available block that will fit on the current page is selected for printing. In determining the largest available block, the system can first make some basic checks to rule out impossible blocks. For example, the maximum width and height on the current page (or sub-region thereof) is known, and this can be compared against a potential block; or, available square-inch area can be compared to rule out potential blocks.

After preliminary checking, the system can then take a potential block and attempt to fit it by rotating the block and seeing if it fits into an available space. Once a block is fit on the page, the space on the page is tracked as in-use, and the algorithm repeats, seeking the next largest block that fits into remaining space on the page. Since the printout may contain multiple pages, print regions are checked in all pages. For simplicity, the first page with an available rectangle large enough to hold the block is used. If there is no such page then a new page is created, or an error is presented to indicate the block is bigger than the printable page.

Exemplary Operating Environment

FIG. 20 and the following discussion are intended to provide a brief, general description of a suitable computing environment in which the invention may be implemented. While the invention has been described in the general context of computer-executable instructions of a computer program that runs on a personal computer, those skilled in the art will recognize that the invention also may be implemented in combination with other program modules. Generally, program modules include hardware or software routines, programs, components, data structures, etc. that perform particular tasks or implement particular abstract data types. Moreover, those skilled in the art will appreciate that the invention can be practiced with other computer system configurations, including hand-held devices, multi-processor systems, microprocessor-based or programmable consumer electronics, minicomputers, mainframe computers, and the like. The illustrated embodiment of the invention can also be practiced in distributed computing environments where tasks are performed by remote processing devices that are linked through a communications network. In a distributed computing environment, program modules can be located in both local and remote memory storage devices.

An exemplary system for implementing the invention includes a computer 820, including a processing unit 821, a system memory 822, and a system bus 823 that couples various system components including the system memory to the processing unit 821. The processing unit may be any of various commercially available processors, including Intel x86, Pentium and compatible microprocessors from Intel and others, the Alpha processor by Digital, and the PowerPC from Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, AGP, VESA, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, and the like, can also be used in the exemplary operating environment.

A number of program modules may be stored in the drives and RAM 825, including an operating system 835, one or more application programs (e.g., Internet browser software) 836, other program modules 837, and program data 838.

A user can enter commands and information into the computer 820 through a keyboard 840 and pointing device, such as a mouse 842. Other input devices (not shown) may include a microphone, joystick, game pad, satellite dish, scanner, virtual reality simulation, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, personal computers typically include other peripheral output devices (not shown), such as speakers and printers.

The computer 820 is expected to operate in a networked environment using logical connections to one or more remote computers, such as a remote computer 849. The remote computer 849 may be a web server, a router, a peer device or other common network node, and typically includes many or all of the elements described relative to the computer 820, although only a memory storage device 850 has been illustrated in FIG. 20. The computer 820 can contact the remote computer 849 over an Internet connection established through a gateway 855 (e.g., a router, dedicated-line, or other network link), a modem 854 link, or by an intra-office local area network (LAN) 851 or wide area network (WAN) 852. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 820, unless indicated otherwise. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where data bits are maintained are physical locations that have particular electrical, magnetic, or optical properties corresponding to the data bits.

Having described and illustrated the principles of my invention with reference to an illustrated embodiment, it will be recognized that the illustrated embodiment can be modified in arrangement and detail without departing from such principles.

For example, while the foregoing description focused—for expository convenience—on simple geometrical pop-up shapes, it will be recognized that the same techniques and analyses can be applied to arbitrarily complex shapes.

In view of the wide variety of geometries to which the principles of my invention can be applied, it should be recognized that the detailed embodiments are illustrative only and should not be taken as limiting the scope of my invention. Rather, what is claimed as the invention is all such modifications as may come within the scope and spirit of the following claims and equivalents thereto.

What is claimed is:

1. A computer-implemented method for creating pop-up cards in a computerized virtual development environment allowing selection and placement of pop-up mechanisms on a card, the method including an input device and a display, the method receiving input from the input device, the input indicating at least one pop-up mechanism positioned relative to an underlying card or other pop-up mechanism, the method comprising:

displaying an underlying card having at least two arbitrarily shaped card-sections existing within corresponding first and second planes, such planes pivotally mounted about an axis L and defining a dihedral angle ω of incidence; and receiving input indicating a proposed position for a pop-up mechanism;

determining based on the input at least three control points, of which the first control point is positioned on the surface of the card-section existing within the first plane, and the second control point is positioned on the surface of the card-section existing within the second plane, and the third control point is positioned on the L axis; and automatically designing a fourth control point such that the pop-up mechanism is folded along a line between the third and fourth control points.

2. The method of claim 1, further comprising:

displaying a graphical user interface, such interface showing a workspace and providing exemplary cards and mechanisms that may be selected for use in the workspace; and receiving an indication that a user has manipulated a graphical selection tool in the graphical user interface, and in response thereto, calculating and displaying the underlying card and pop-up mechanisms in the workspace.

3. A method according to claim 1, wherein as angle ω approaches 180 degrees, the pop-up mechanism approaches lying flat with the first and second planes.

4. A computer-readable medium having encoded thereon instructions for directing a computer to perform the method of claim 1.

5. A computer-implemented method for automatically determining a position for a pop-up vertex B of a pop-up mechanism in communication with a folding card, a user of the method indicating selections presented to the user on a graphical user interface, the method comprising:

selecting by the user, a folding card having planar surfaces π1 and π2 pivotal about an axis L;

selecting by the user, proposed pop-up mechanism coordinates indicated by vertices A, D, and C;

automatically determining a pop-up vertex B, a planar surface π3 defined by vertices A, B, D, and a planar surface π4 defined by vertices A, B, C, where surface π3 is integral to surface π1, and surface π4 is integral to surface π2;

intersecting three geometrical objects, each object having a radius and being respectively defined about vertices A, C and D, such intersection identifying intersection points common to each geometrical object; and automatically determining pop-up vertex B to be such common intersection point spatially positioned at or above surfaces π1 and π2.

6. A method according to claim 5, in which the three geometrical objects are spheres, and intersecting three geometrical objects includes:

defining a first sphere about vertex A having a radius AB;

defining a second sphere about vertex C having a radius CB; and wherein intersection of each sphere determines the intersection points common to each geometrical object.

7. A method according to claim 6, further comprising:

defining a third sphere about vertex D having a radius DB.

8. A method according to claim 5, in which the three geometrical objects are circles, and intersecting three geometrical objects includes:

defining a first circle about vertex A having radius AB;

defining a second circle about vertex C having radius CB;

defining a first plane about a first radical axis between the first and second circles; and defining a second plane about a second radical axis between the second and third circles;

wherein intersection of each plane determines the intersection points common to each geometrical object.

9. A method according to claim 8, further comprising:

defining a third circle about vertex D having radius DB; and defining a third plane about a third radical axis between the first and third circles.

10. A method according to claim 9, wherein said circles mutually intersect, and said radical axes mutually intersect.

11. A method according to claim 9, wherein the position of B is restricted to spatial locations both perpendicular to CD and within a fourth plane defined by axis L.

12. A computer-readable medium having encoded thereon instructions for directing a computer to perform the method of claim 5.

13. A computer-implemented method for determining a closed-card position for a pop-up vertex B of an asymmetric slit pop-up mechanism in a folding card, a folding axis L for the folding card, such mechanism having a bounding triangle defined by vertices A, C, and D, the method automatically determining a first inner triangle defined by vertices A, B, D, and a second inner triangle defined by vertices A, B, C, the method comprising:

receiving input indicating the bounding triangle;

determining automatically a point E along line segment DC, and aligning line segment AE with the axis L;

determining automatically, an angle γ between AC and AE; and determining automatically pop-up vertex B along DC such that the angle between AD and AB is equivalent to γ.

14. A computer-readable medium having encoded thereon instructions for directing a computer to perform claim 13.

15. A computer-implemented system for creating pop-up cards in a computerized virtual development environment allowing selection and placement of pop-up mechanisms on a card, each card containing at least one pop-up mechanism spatially positioned relative to an underlying card or other pop-up mechanism, the system comprising:

graphical interface means for displaying and manipulating a pop-up card and a pop-up mechanism for such card;

graphical selection means for selecting the pop-up mechanism with a set of minimum constraints;

attachment means for automatically determining at least one other constraint for the pop-up mechanism and attaching the pop-up mechanism to the pop-up card;

means for interactively reconfiguring the pop-up card and the pop-up mechanism constraint with the graphical selection means; and means for animating the pop-up card and the pop-up mechanism subject to the constraints.

16. The system of claim 15, further comprising printing means for printing the pop-up card and the pop-up mechanism.

17. A computerized graphical card design system for designing, displaying, and manipulating a pop-up card, comprising:

design arrangement for designing a pop-up card including receiving user input indicating certain design constraints, and the automatic determination of another design constraint;

data accessing arrangement for storing and accessing data corresponding to geometric characteristics of the pop-up card, and data corresponding to features of the pop-up card;

adjustment arrangement, in communication with the data accessing arrangement, for adjusting the geometric characteristics of the pop-up card in response to user input; and display arrangement, in communication with the data accessing arrangement, for displaying the geometric characteristics of the pop-up card.

18. A system according to claim 17, wherein the adjustment arrangement includes a graphical selector tool for selecting a card piece shown by the display arrangement.

19. A system according to claim 17, wherein the design arrangement includes dragging and dropping card objects onto the pop-up card, and operates in conjunction with the data accessing arrangement so that data corresponding to geometric characteristics for a dropped card object are stored.

20. A system according to claim 19, further including a collision detection arrangement operating in conjunction with the design arrangement to prevent placement of card object which would prevent correct operation of the card.

21. A system according to claim 19, wherein geometric characteristics for a dropped card object are assigned default values.

22. A system according to claim 17, in which a pop-up card has plural regions, and wherein the display arrangement displays a first region at a different level of detail than for a second region.

23. A system according to claim 17, in which the display arrangement includes level data indicating relative spatial positions for objects in a card design, and wherein an object is displayed in a format according to its level.

24. A system according to claim 23, wherein the data accessing arrangement includes a level change arrangement for changing the level of the object.

25. A system according to claim 24, wherein the level change arrangement includes dragging and dropping features of the pop-up card.

26. A system according to claim 24, wherein the data access arrangement operates in conjunction with the display arrangement to allow interactive selection and modification of a displayed object.

27. A system according to claim 17, wherein the data accessing arrangement includes a constraint verification arrangement to prevent storage of geometric characteristics in violation of a known constraint.

28. A system according to claim 27, further comprising an animation arrangement for animating the pop-up card by assigning values to geometric characteristics of the pop-up card as limited by the constraint verification arrangement.

29. A computer readable medium having encoded thereon instructions for directing a computer to perform the system of claim 17.

30. A computer-implemented method of designing a pop-up card on a computer system, comprising:

defining a base having first and second members coupled about a fold axis;

determining from user input a proposed spatial relationship of a pop-up portion with the base;

determining automatically from the proposed spatial relationship, both an actual location where the pop-up portion is fixed to the base and an actual spatial relationship with the base; and displaying the determined actual location and actual spatial relationship of the pop-up portion with the base when the first and second members of the base have a given angle there between.

31. The method of claim 30, wherein the pop-up portion lies flat with the first and second members of the base when the card is closed.

32. The method of claim 30, further comprising printing the pop-up card on a minimal quantity of output media.

33. The method of claim 30, wherein the pop-up portion is printed with attachment-flaps, and the base printed with markings indicating affixment positions for the attachment-flaps on the base.

34. A computer-implemented system for printing a pop-up card developed in a graphical interactive environment implemented by plural computer-readable program modules, in which the pop-up card contains at least one pop-up mechanism spatially positioned relative to an underlying card or other pop-up mechanism, the system comprising:

a design module configured to provide interactive design and development of a pop-up card;

a printing module configured to provide for printing the pop-up card on an output media; and a packing module operating in conjunction with the printing module, in which the packing module determines an optimized layout for printing the underlying card and the pop-up mechanism by seeking a largest available block that will fit on the current page, so that use of output media is minimized;

wherein the printing module prints the underlying card with markings indicating an affixment location for a pop-up mechanism.

35. The system of claim 34, in which the pop-up mechanism is printed with affixment tabs, and wherein the printing module marks the underlying card so as to indicate placement of such tabs on the underlying card.

36. The system of claim 35, further comprising means for printing different markings representing a cut or a fold on the underlying card or the at least one pop-up mechanism.

37. The system of claim 36, wherein different marks are printed for a fold into the underlying card and a fold out of the underlying card.

38. The system of claim 34, in which a horizon is defined and the pop-up mechanism has an associated texture, the system further comprising means for adjusting the associated texture according to such horizon.

39. A computerized method for designing pop-up cards, including an input device and a display, the method comprising:

displaying a pop-up card base with a left side and a right side pivotally joined along an L axis, said L axis logically extending beyond the pop-up card base;

receiving at the input device an indication of a pop-up to be mounted on the pop-up card base;

determining from the indication of the pop-up, two points of intersection, a first point of intersection being an intersection between the left side of the base card and the left side of the pop-up, a second point of intersection being an intersection between the right side of the based card and the right side of the pop-up;

determining from the indication of the pop-up, a third point along the L axis;

designing based on the three points, a fourth point located on the pop-up; and designing a folding line for the pop-up, the folding line being defined by an imaginary line between the fourth point and the third point.

40. The method of claim 39, including animating the action of the pop-up as the left side and right side of the pop-up card base pivot along the L axis, the method comprising:

determining a first reference sphere with a center at the first point and a radius equal to the distance between the first and fourth points;

determining a second reference sphere with a center at the second point and a radius equal to the distance between the second and fourth points;

determining a third reference sphere with a center at the third point and a radius equal to the distance between the third and fourth points;

animating the pop-up as pivotally fixed to the pop-up card at the first and second points, and animating the folding line for the pop-up, as spatially varied along an imaginary line between the third point and a changing point above the pop-up card base, the changing point identified as the point of intersection of the three reference spheres which changes as the left and right side of the base card pivot along the L axis.

* * * * *

UNITED STATES PATENT AND TRADEMARK OFFICE
CERTIFICATE OF CORRECTION

PATENT NO. : 6,311,142 B1
DATED : October 30, 2001
INVENTOR(S) : Glassner

It is certified that error appears in the above-identified patent and that said Letters Patent is hereby corrected as shown below:

Column 3,
Line 15, "$\pi_{22}$" should read -- $\pi_2$ --.
Line 39, "o" should read -- $\omega$ --.
Line 40, "$B_{107}$" should read -- $B_\omega$ --.
Line 40, "$C_\omega$" should read -- $C_\omega$. --.
Line 45, "$B_o$ and $C_o$" should read -- B and C --.
Line 65, "$\pi_o$" should read -- $\pi$-$\omega$ --.

Column 4,
Line 21, "$+_\omega$" should read -- $+B_\omega$ --.

Column 5,
Line 22, "$+r_1^2$" should read -- $r_2^2$ --.
Line 65, "$\phi$" should read -- $\varphi$ --.

Column 6,
Line 12, "$\pi=2\phi+(\pi-2\delta)+(\pi-2\phi)$" should read --$\pi=2\varphi+(\pi-2\delta)+(\pi-2\phi)$"--.
Line 13, "$2\phi=2\phi+\pi-2\delta$" should read --$2\phi=2\varphi+\pi-2\delta$"--.
Line 14, "$\phi=\phi-\delta+(\pi/2)$" should read --$\phi=\varphi-\delta+(\pi/2)$"--.
Line 16, "$\pi=\alpha+\phi+\pi-\phi$" should read --$\pi=\alpha+\varphi+\pi-\phi$--.
Line 17, "$\alpha=\phi+\pi-\pi-\phi$" should read --$\alpha=\phi+\pi-\pi-\varphi$--.
Line 18, "$\alpha=\phi-\phi$" should read --$\alpha=\phi-\varphi$--.
Line 20, "$\alpha=(\phi-\delta+(\pi/2))-\phi$" should read --$\alpha=(\varphi-\delta+(\pi/2))-\varphi$--.
Line 21, "$\alpha=(\phi-\phi+(\pi/2))-\delta$" should read --$\alpha=(\varphi-\varphi+(\pi/2))-\delta$--.

Column 7,
Line 41, "($\omega$" should read -- $\omega$ --.

Signed and Sealed this

Nineteenth Day of November, 2002

*Attest:*

*Attesting Officer*

JAMES E. ROGAN
*Director of the United States Patent and Trademark Office*